US006138195A

United States Patent [19]

Bermingham et al.

[11] Patent Number: 6,138,195
[45] Date of Patent: Oct. 24, 2000

[54] METHOD AND APPARATUS FOR HOT-PLUGGING CIRCUIT BOARDS HAVING LOW VOLTAGE LOGIC PARTS INTO A HIGHER VOLTAGE BACKPLANE

[75] Inventors: Michael Bermingham, Framingham; Christopher S. MacLellan, Norwood; John K. Walton, Mendon, all of Mass.

[73] Assignee: EMC Corporation, Hopkinton, Mass.

[21] Appl. No.: 09/045,037

[22] Filed: Mar. 20, 1998

[51] Int. Cl.$^7$ ............................................. G06F 13/00
[52] U.S. Cl. .................... 710/104; 710/102; 710/103; 713/300; 713/330; 713/340; 365/26
[58] Field of Search ............................. 710/104, 101, 710/102, 103; 713/300, 330, 340; 365/226, 227, 228, 229

[56] References Cited

U.S. PATENT DOCUMENTS

| | | | |
|---|---|---|---|
| 5,825,600 | 10/1998 | Watt | 361/56 |
| 5,938,742 | 8/1999 | Faddell et al. | 710/9 |

Primary Examiner—Ario Etienne
Attorney, Agent, or Firm—Brian L. Michaelis, Esq.; Brown Rudnick Freed & Gesmer, PC

[57] ABSTRACT

A method and apparatus for hot-plugging circuit boards having lower voltage logic devices into a higher voltage backplane in a manner that minimizes overvoltage stress during system power-up, or during a lower voltage power failure. The method and apparatus ensures that the lower voltage device(s') power input reaches at least a nominal input level before any other inputs of the device are driven to a level greater than or equal to an expected input level. Dedicated output pins on lower voltage logic device(s) are configured to issue a control output signal for enabling higher voltage devices. Output enable terminals for the higher voltage parts, which are connected to respective control outputs from a lower voltage device, are normally in a disabled state as a function of pull-up or pull-down circuitry. A respective control output signal is provided for each higher voltage device output enable to enable the outputs of the higher voltage device when the voltage supply input to the lower voltage device is at substantially full voltage.

20 Claims, 4 Drawing Sheets

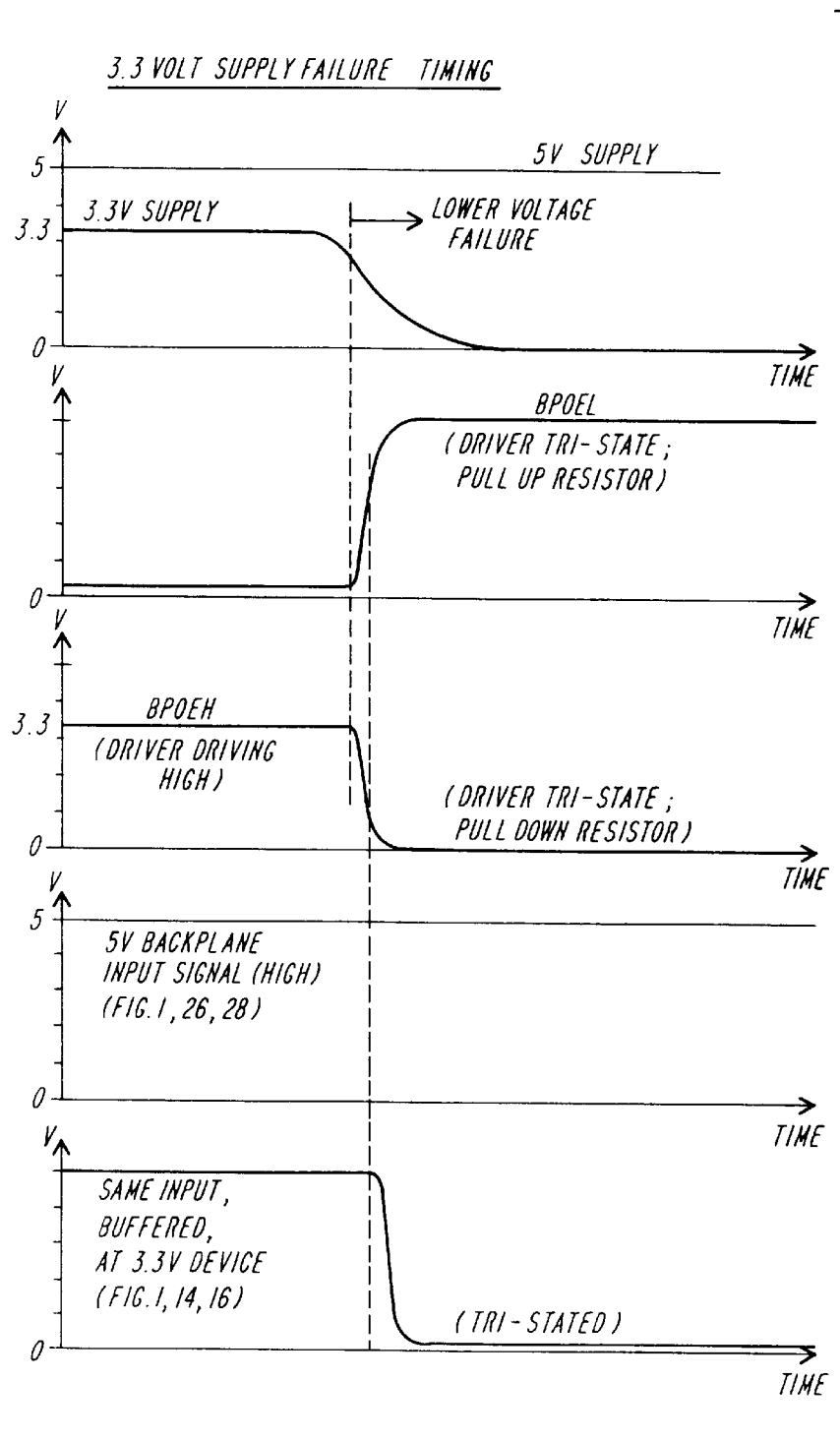

METHOD AND APPARATUS FOR HOT-PLUGGING CIRCUIT BOARDS HAVING LOW VOLTAGE LOGIC PARTS INTO A HIGHER VOLTAGE BACKPLANE

FIELD OF THE INVENTION

The present invention relates to installing and removing electronic su-bassemblies, and more particularly to installing electronic sub-assemblies into and removing electronic sub-assemblies from a live or powered-up electronic assembly.

BACKGROUND OF THE INVENTION

Various implementations are known for effecting "hot-swapping" or "hot-plugging," i.e. live insertion and removal, of electronic sub-assemblies. The typical, primary concern in such implementations is to insert an electronic sub-assembly into or remove an electronic sub-assembly from an electronic assembly having power applied thereto, without causing any damage to electronic components on the sub-assembly or in the electronic assembly.

Typical approaches involve mechanical implementations, such as switches or varying length interconnect pins as described in U.S. Pat. Nos. 5,664,119 and 5,317,697, respectively. The switches or variable length pins are implemented in a manner that effects controlled ramp-up/ramp-down of the sub-assembly, and avoids adverse affects on ongoing system operations. Such mechanical implementations add significant additional cost in the form of additional hardware and specialized hardware configurations. They also add complexity to the system design.

In various high reliability/maintainability, or fault tolerant electronic hardware systems, the system includes circuit boards having mixed voltage logic parts or devices, for example some 5 Volt and some 3.3 Volt parts. In such systems the circuit boards must be capable of being hot-plugged into an operating backplane. Typically, the 5V and 3.3V parts run from separate 5V and 3.3V supplies, and the backplane and all backplane interface logic is 5V-only. Thus 3.3V logic devices connect to the 5V interface logic.

In conventional logic devices used in such mixed voltage systems, the input pins of the 3.3V devices are 5 Volt tolerant, in that voltage limiting circuits have been added to 3.3V input buffer structures by the manufacturers to offer an interface capability compatible with 5V logic levels. Typical 5V compatible input buffers are designed to accept valid 5V TTL or CMOS input levels, along with normal transient levels, at the device input limited input pins.

This input voltage limiting alone, is effective for steady-state conditions, but special concerns exist during hot-plugging. During insertion of the board into a hot (live 5-Volt) backplane, the 5V and 3.3V power levels in general ramp up at different rates. That is, the nominal times that it takes for the respective 5V and 3.3V power levels to be established are different. The ramp up difference is exacerbated if the 3.3V supply is generated on-board, derived from the 5V supply by means of a DC-DC converter or voltage regulator. The potential for undesirable adverse affects on ongoing system operations is particularly pronounced if the 3.3V supply fails while the 5V supply continues to operate.

CMOS components, such as ASIC devices, are subject to stress if their inputs are driven to a level greater than 3.3V before the supply voltage has reached a nominal voltage level, i.e. 3.0V. Gate oxide breakdown or deterioration, and/or junction breakdown may occur in such devices as voltage levels at the inputs rise while supply voltage levels remain below nominal levels. Similarly, latch-up conditions can occur under such circumstances. A more serious condition exists if the 3.3V supply fails while the 5V supply continues to operate. In such a case, device inputs are subjected to prolonged exposure to high voltages during the adverse power condition and permanent destruction of the device can result.

SUMMARY OF THE INVENTION

The present invention provides a method and apparatus for hot-plugging circuit boards having lower voltage logic devices into a higher voltage backplane in a manner that minimizes overvoltage stress during system power-up, or during a lower voltage power failure. The method and apparatus ensures that the lower voltage device(s') power input reaches at least a nominal input level before any other inputs of the device are driven to a level greater than or equal to an expected input level.

According to the invention, dedicated output pins on lower voltage logic device(s) (e.g. 3.3V devices), are configured to issue a control output signal for enabling higher voltage devices (e.g. 5V devices). Output enable terminals for the higher voltage parts, which are connected to respective control outputs from a lower voltage device, are normally in a disabled state. A respective control output signal is provided for each higher voltage device output enable.

The higher voltage device(s) should be tri-state output devices and must be configured to have power-off disable outputs. That is, as the device powers up, its output buffers remain in an inactive or high impedance state until its supply voltage is reached, and thereafter the output buffers are not turned on as long as the device's output enable is deasserted. The lower voltage device is also configured as a power-off disable output device designed to include circuitry to test the state of its own power source, and to always assert the output enable for the higher voltage device(s) via the dedicated output pin(s) configured to issue the control output signal(s), during normal, i.e. VCC established, operation (of the lower voltage device).

In further accord with the invention, when the sub-assembly according to the invention is removed from the backplane, the control output from the lower voltage device driving the output enable of the higher voltage device is disabled or tri-stated (in a high impedance state) ensuring that no overvoltage conditions are present at inputs of the lower voltage device. Similarly, in the event of a lower voltage power failure, the control output from the lower voltage device driving the output enable of the higher voltage device is disabled or tri-stated, ensuring that the higher voltage device outputs are disabled or tri-stated and that any higher voltage signals that may be present at the input(s) of the higher voltage device are not provided to the input(s) of the lower voltage device.

Features of the invention include provision of a method and apparatus that substantially avoids damage to mixed voltage parts used on electronic sub-assemblies that are hot plugged into electronic assemblies. The significant additional cost and specialized hardware configurations associated with mechanical implementations known in the prior art are substantially avoided in the method and apparatus according to the invention. Similarly, there is no significant complexity added to system design, and significant additional space or physical considerations are not required for implementation. The potential for gate oxide breakdown or deterioration, and/or junction breakdown in CMOS devices, which can occur as voltage levels at the inputs rise while supply voltage levels remain below nominal levels, is substantially avoided. Additionally, latch-up conditions in CMOS devices, due to power-up abnormalities, are substantially avoided.

BRIEF DESCRIPTION OF THE DRAWING

The foregoing and other features and advantages of the present invention will be more fully understood from the following detailed description of illustrative embodiments, taken in conjunction with the accompanying drawing in which:

FIG. 4 is a timing diagram of a hot-plugging lower voltage power-fail sequence according to the invention.

DETAILED DESCRIPTION OF THE INVENTION

A method and apparatus according to the invention is implemented in a system that uses circuit boards or electronic sub-assemblies having mixed voltage, i.e. some higher voltage and some lower voltage, logic parts that are likely to be hot-plugged into a backplane of an electronic assembly that operates at the higher voltage. For example, an illustrative implementation includes modular memory boards having at least one 3.3 Volt supplied logic device implementing control functions, and at least one 5 Volt supplied backplane receiver or interface device for interconnecting the memory board(s) into a 5 Volt backplane. Such a modular memory board can be one such as implemented in an Integrated Cache Disk Array system wherein a plurality of memory boards comprise cache memory, and each of the memory boards is configured to be hotplugged into an operating backplane, as described in detail hereinafter.

Figure 1:
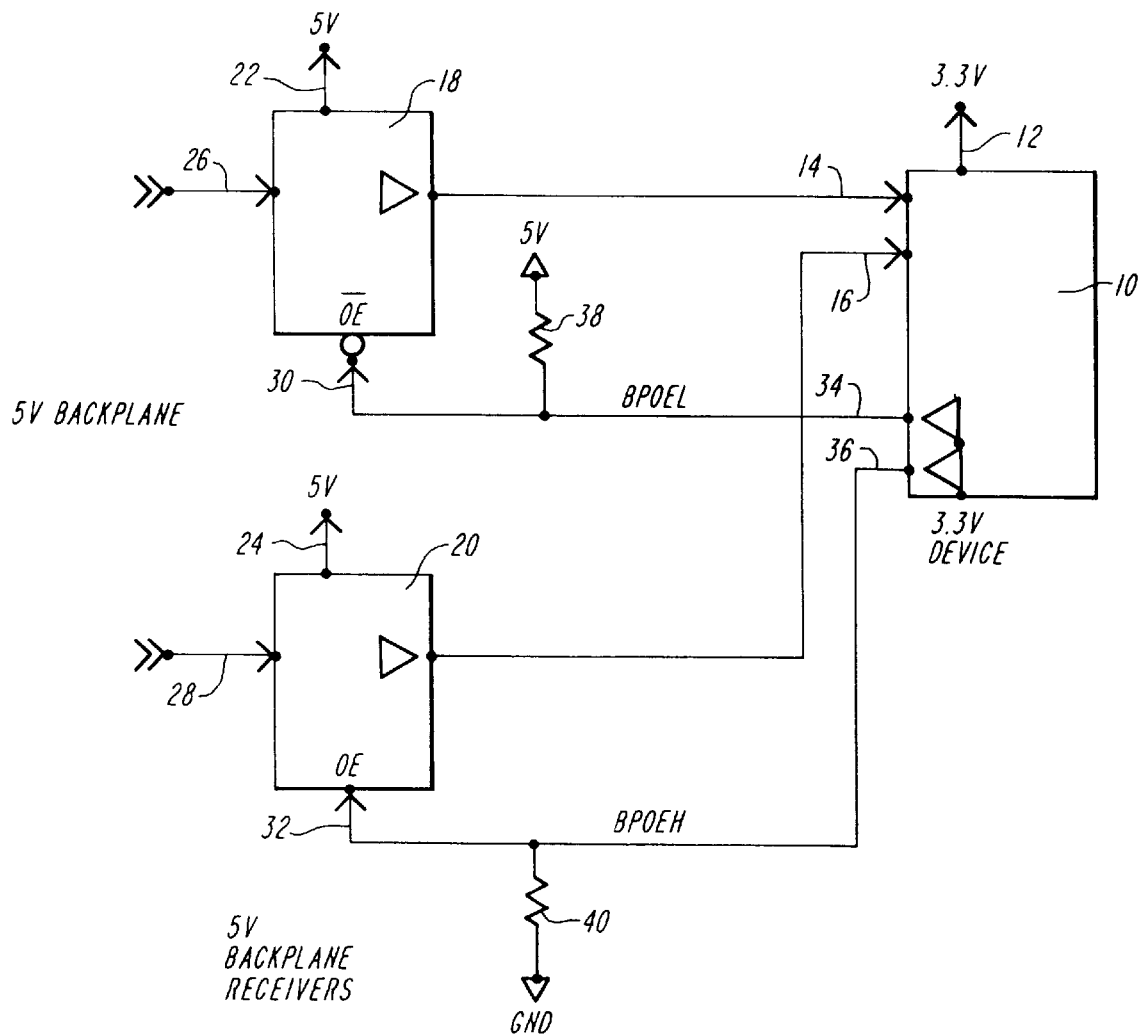
FIG. 1 is a schematic diagram of a lower voltage device and a higher voltage device implementing hot-plugging protection circuitry according to the invention.

Referring to FIG. 1, in this illustrative embodiment the at least one 3.3V logic device 10 has a voltage supply input pin 12 (typically referred to as VDD), which should reach a level of at least 3.0V before any other inputs of the 3.3V device are driven to a level greater than or equal to 3.3V, in order to minimize overvoltage stress during system power-up or during a 3.3V power failure. For purposes of simplifying illustration and discussion of the illustrative embodiment of the invention, only two other inputs 14, 16 of the 3.3V device are shown. One of the inputs 14 to the 3.3V device 10 is from a first illustrative backplane receiver 18, while another of the inputs 16 to the 3.3V device 10 is from a second illustrative backplane receiver 20. It should be appreciated as well, that the backplane receivers 18, 20 only have limited interconnections shown for purposes of illustration of the invention.

The backplane receivers 18, 20 are higher voltage devices than the 3.3V logic device, and in this illustrative embodiment they require 5V applied to respective voltage supply input pins 22, 24. Each of the receivers 18, 20 receives signals at respective inputs 26, 28 connected to a 5V backplane (only one backplane input is shown for each receiver for purposes of simplified illustration).

The 5V backplane receivers 18, 20 driving the 3.3V logic device 10 in this illustrative embodiment are tri-stateable, as known in the art. Each of the receivers 18, 20 has a respective output enable (OE) control pin 30, 32 which must be asserted in order for the outputs 14, 16 to turn on, i.e. be in a logic high or logic low state. With the OE control pin deasserted the outputs are in a third, high impedance state. For illustration purposes, one of the backplane receivers 18 has an active low output enable 30 and the other backplane receiver 20 has an active high output enable 32. The 5V backplane receivers 18, 20 are configured to have power off disable circuitry or outputs, as known in the art. This means that, as the device powers up its input power voltage is sensed by internal circuitry, and its output buffers remain in the high-impedance state until after its supply level is established. As long as the OE control pin is deasserted, the output buffers will not turn on.

The 3.3V logic device(s) 10 also has power-off disable circuitry or outputs in order to protect its outputs and any circuitry driven thereby. The 3.3V logic device 10 in this illustrative embodiment is an LCA500K CMOS Gate Array, manufactured by LSI Logic, and described in detail in 500K Technology Design Manual and LCA 500K Design Manual published by LSI Logic, Milpitas, Calif., which are incorporated herein by reference. The device 10 is configured to have dedicated output pins 34, 36 control, respectively, the 5V devices' 18, 20 output enable (OE) pins 30, 32. One control signal is required per OE sense (again, for purposes of illustration one OE 30 is active low and another OE 32 is active high). A control output signal (34) driving the active-low OE pin 30 is referenced as BPOEL, and another control output signal (36) driving the active-high OE pin 32 is referenced as BPOEH.

The active-low OE pin 30 is passively pulled to the deasserted state with a pull up resistor 38 to the 5 volt rail. The 3.3V device implements circuitry that always drives the (active-low) OE 30 on, during normal operation of the 3.3V lower voltage logic device. Thus when supply input pin 12 reaches normal operating voltage, BPOEL is driven low to enable the higher voltage backplane receiver 18. The lower voltage device 10 in this illustrative embodiment is at normal operating voltage when VCC is established and it is out of power-on reset state. Thereafter, the lower voltage logic device 10 receives at its input 14, the output of the backplane receiver 18, which is enabled by the control output 34 from the lower voltage device 10.

Similarly, the active-high OE pin 32 is passively pulled to the deasserted state with a pull down resistor 40 to ground. The 3.3V device 10 implements circuitry that always drives the (active-high) OE 32 during its normal operation. Thus when supply input pin 12 reaches normal operating voltage, BPOEH is driven high to enable the higher voltage backplane receiver 20. Thereafter, the lower voltage device 10 receives at its input 16, the output of the backplane receiver 20.

Figure 2:
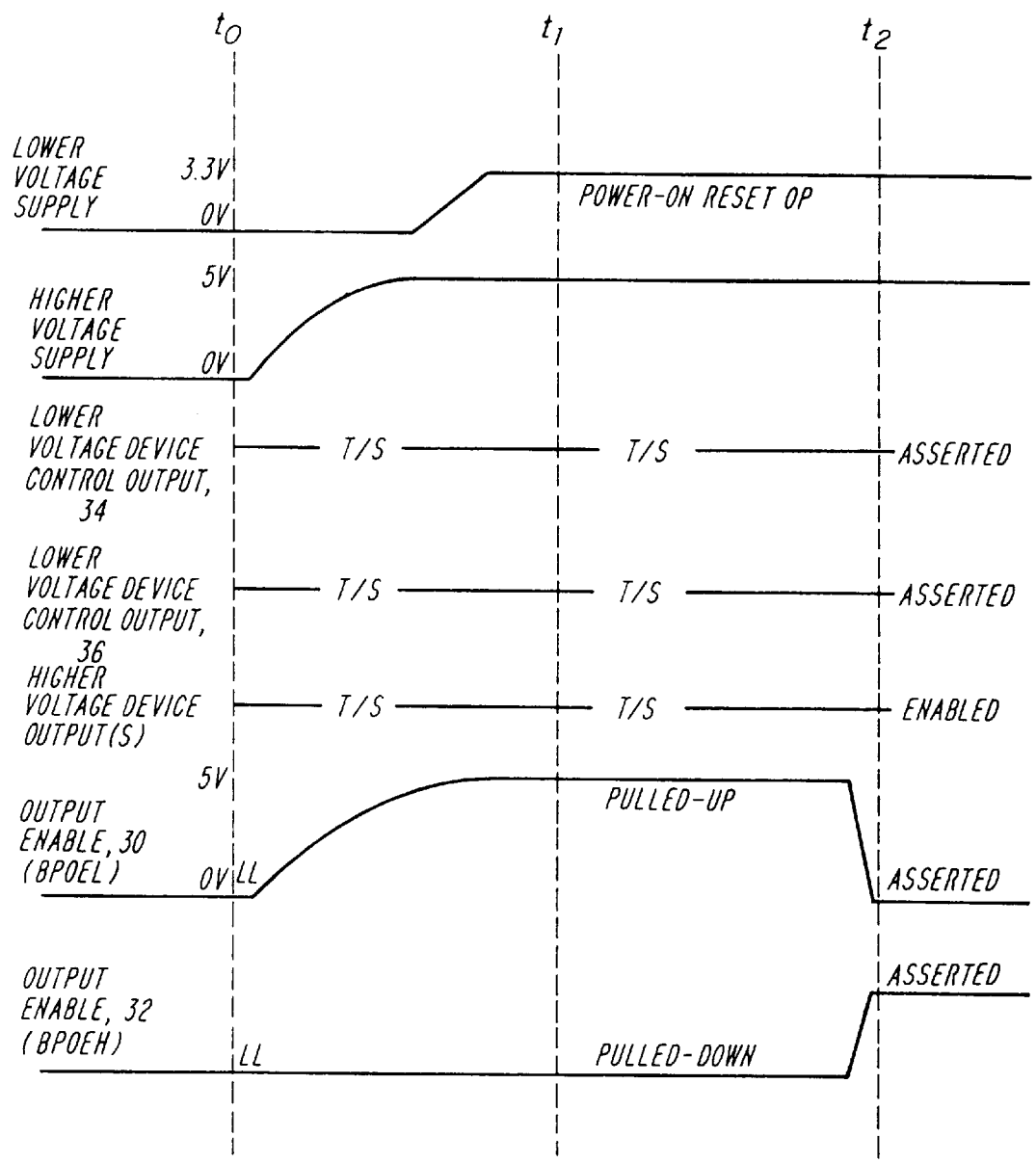
FIG. 2 is a timing diagram of pertinent signals in a power-up sequence, implemented in the circuitry of FIG. 1.

A power-up sequence for the hot-plugging implementation according to the invention is illustrated in the timing diagram of FIG. 2.

Upon hot-plugging the mixed voltage circuit into a live backplane, neither the 3.3V (lower voltage) nor 5V (higher voltage) levels are initially established. In the initial state (to), all drivers of both the 3.3V and 5V devices are tri-stated (T/S). The output enable 32 (BPOEH) is pulled to a logic low (LL) with the pulldown resistor 40. In this illustrative embodiment the 5V ramps up first and the 3.3V supply is derived from the 5V supply. As the 5V ramps up, the output enable 30 (BPOEL) goes to a logic low because of the pullup resistor 38.

After the 5V VCC level has been established (ti), the 5V devices are operational, but their drivers remain tri-stated due to the state of their OE pins. Sometime after the 5V supply begins to ramp up, the 3.3V supply begins. The 3.3V logic's outputs remain tri-stated until after the 3.3V level is established, and the device completes its power-on reset sequence. After completing power-on reset (t$_2$), the 3.3V logic's outputs, including control outputs BPOEL (34) and BPOEH (36) are driven or asserted, which turns on or enables the 5V logic's outputs. Thus the 3.3V logic will not receive 5V logic levels until after the 3.3V VCC has been established.

Figure 3:
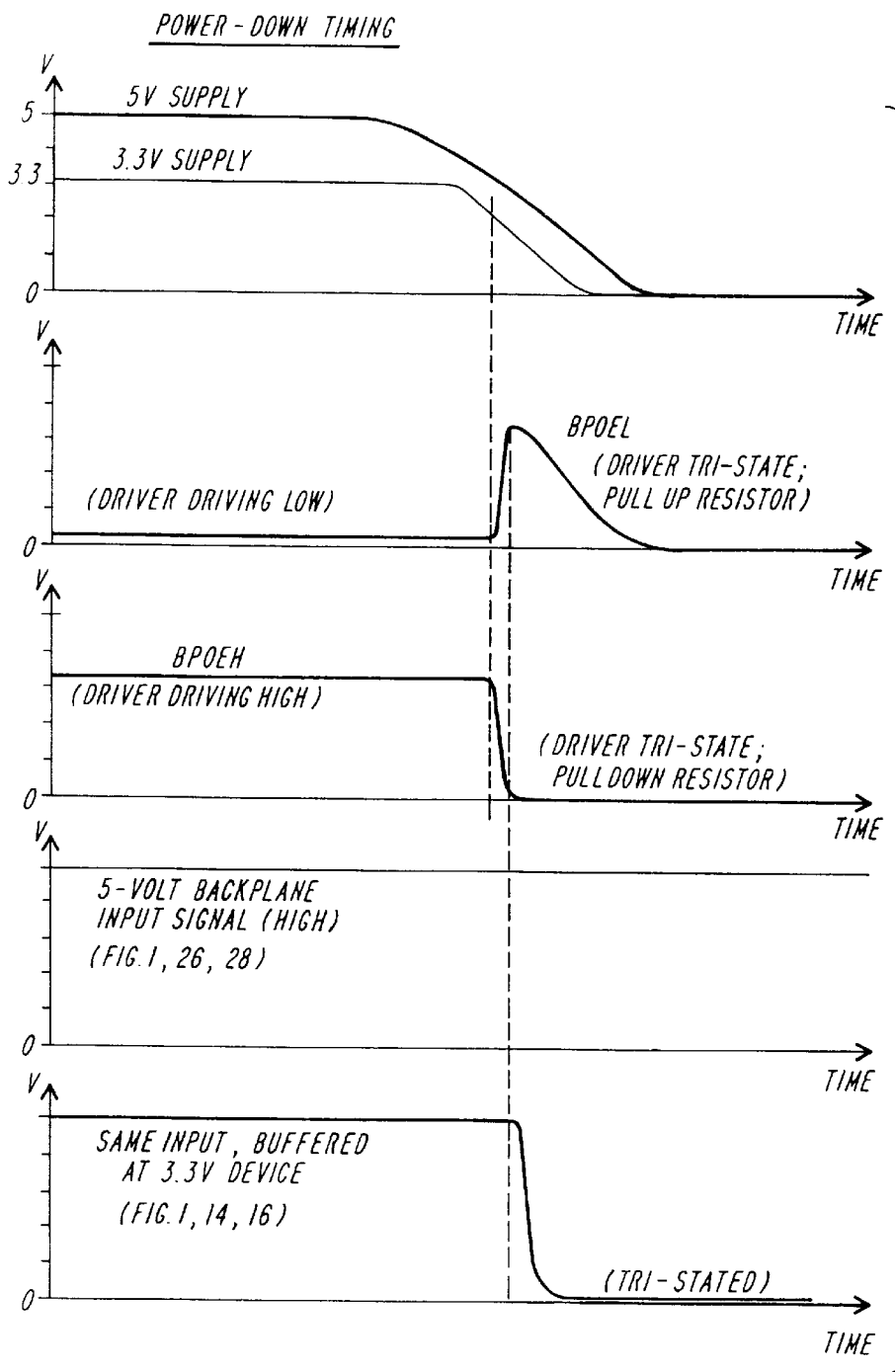
FIG. 3 is a timing diagram of a hot-plugging power-down sequence according to the invention.

The opposite effectively happens during a power-down sequence, as illustrated in FIG. 3, when the live board is withdrawn from the live backplane. During the power down sequence the 3.3V and 5V supplies ramp down substantially simultaneously. It will be appreciated that the "ramp-down" time occurring as a board is unplugged from the live backplane is fairly instantaneous. As the lower voltage supply disappears the lower voltage logic device outputs are tri-stated (because it is a power-off disable device). As a consequence of the tri-stated control outputs (FIGS. 1, 34, 36), output enable 32 (BPOEH) is pulled to a logic low (LL) with the pulldown resistor 40. As the 5V signal disappears, the outputs of the higher voltage devices 18, 20 are tri-stated (because they too are power-off disable devices). With the output enables of the higher voltage devices disabled and the driving outputs tri-stated, no voltages can drive the lower voltage device as the mixed circuit powers down.

As illustrated in FIG. 4, when there is a lower voltage power failure 5V signals may still be present at the inputs of the 5V devices. As the lower voltage (3.3V) is lost, the control outputs (BPEOL, BPOEH) from the lower voltage device driving the output enables of the higher voltage devices are tri-stated. With 5V still present, the pull-up and pull-down circuitry causes the output enables of the higher voltage devices to be deasserted. This ensures that the higher voltage device outputs are tri-stated and that any higher voltage signals present at the input(s) of the higher voltage device (FIGS. 1, 26, 28) are not provided to the input(s) of the lower voltage device (FIGS. 1, 14, 16).

While the system described hereinbefore involves circuit boards or circuitry having mixed voltage logic parts, for example 5 Volt and 3.3 Volt, it will be appreciated that the invention can be implemented in the context of other relative high and low voltage signals and devices, such as with 3.3 Volt and 2.5 Volt parts. Further, it should be appreciated that the lower voltage device(s) and the higher voltage device(s) of the mixed voltage circuitry can be implemented to be hot-plugged into a higher voltage interface that is substantially equal to or higher than the voltage needed to supply the higher voltage device(s).

Likewise, although the invention is described in the context of a board, such as a memory board, being hot-plugged into an operating backplane, it should be appreciated that the technique according to the invention is extendable to any mixed-voltage system or circuitry. Similarly, while the invention is described in a context wherein the lower voltage is derived from the higher voltage, such as with a lower voltage generated on-board with the mixed voltage circuits utilizing the lower voltage, it should be appreciated that the invention can be implemented in a context wherein the voltage sources are independent, (as opposed to one being derived from the other).

Although the 3.3V logic device is described in the illustrative embodiment as an LSI Logic LCA500K CMOS Gate Array, with a built in power-on reset routine, it will be appreciated that other lower voltage logic devices can be implemented in mixed voltage circuitry, such as the Advanced Micro Devices (AMD) MACH V family of Programmable Logic Devices (PLDs), the Integrated Device Technology (IDT) FCT family of low voltage transceiver logic, or the like, and that such devices may or may not have power-on reset routines that effectively delay output of the control output(s) from the lower voltage device.

While an active-low enabled backplane interface device is illustrated in conjunction with an active-high enabled interface device, it will be appreciated that all of the higher voltage devices controlled by the lower voltage device control output(s) can be enabled by the same active logic level (high or low). Furthermore, although the higher voltage devices described herein are backplane interface devices, it will be appreciated that the invention can be implemented in other contexts, such as in-circuit (as opposed to interface) applications where higher voltage devices are driving lower voltage devices, and with other higher voltage devices (other than interface drivers), such as line drivers (e.g. Texas Instrument family of line drivers), or the like, driving lower voltage devices.

It should be further appreciated that devises other than tri-stateable devices could be used with effectively disabled outputs, such as in an implementation wherein logic is implemented in-line with higher voltage device outputs to ensure that any input to a low voltage device is low when the lower voltage device is not at full voltage.

Although the invention is described herein with respect to an illustrative embodiment thereof, it should be appreciated that the foregoing and various other changes, omissions or additions in the form and detail thereof may be made without departing from the spirit and scope of the invention.

What is claimed is:

1. A method for employing lower voltage logic parts in circuits that are hot-pluggable into a higher voltage interface, comprising the steps of:

configuring a mixed voltage circuit having at least one lower voltage device and at least one higher voltage device, said at least one lower voltage device including a lower voltage supply input, at least one other input and at least one control output, and said at least one higher voltage device including a higher voltage supply input, at least one output and at least one output enable enabling said at least one output;

configuring said lower voltage device so that said at least one control output is deasserted when said lower voltage supply input of said at least one lower voltage device is not in a normal operation state;

configuring said higher voltage device so that said at least one output is deasserted when said higher voltage supply input of said at least one higher voltage device is not in a normal operation state;

electrically interconnecting said at least one control output of said lower voltage device to said at least one output enable of said higher voltage device, and electrically interconnecting said at least one output of said higher voltage device to said at least one other input of said lower voltage device;

maintaining said at least one output enable of said at least one higher voltage device in a normally deasserted state when said lower voltage supply input of said at least one lower voltage device is not in a normal operation state;

using said at least one control output of said lower voltage device to drive said at least one output enable of said higher voltage device to enable said at least one output of said at least one higher voltage device when said lower voltage supply input of said at least one lower voltage device is in a normal operation state.

2. The method of claim 1 wherein said step of configuring said lower voltage device so that said at least one control output is deasserted when said lower voltage supply input of said at least one lower voltage device is not in a normal operation state involves selecting said at least one lower voltage device to be a power off disable device.

3. The method of claim 1 wherein said step of configuring said higher voltage device so that said at least one output is deasserted when said higher voltage supply input of said at least one higher voltage device is not in a normal operation state involves selecting said at least one higher voltage device as being a power off disable device.

4. The method of claim 1 wherein said step of maintaining said at least one output enable of said at least one higher voltage device in a normally deasserted state when said lower voltage supply input of said at least one lower voltage device is not in a normal operation state involves interconnecting said at least one output enable to one of pull-up and pull-down circuitry.

5. The method of claim 1 wherein said at least one control output is deasserted by maintaining said at least one control output in a high impedance state when said lower voltage supply input of said at least one lower voltage device is not in a normal operation state.

6. The method of claim 1 wherein said at least one output of said at least one higher voltage device is deasserted by maintaining said at least one output in a high impedance state when said higher voltage supply input of said at least one higher voltage device is not in a normal operation state.

7. An apparatus including mixed voltage circuitry that is hot-pluggable into a higher voltage interface, said apparatus having at least one lower voltage device and at least one higher voltage device, said at least one lower voltage device including a lower voltage supply input and at least one other input, and said at least one higher voltage device including a higher voltage supply input, at least one output and at least one output enable enabling said at least one output, wherein the apparatus comprises:

a control output generated from said lower voltage device and connected to said at least one output enable of said higher voltage device, said control output being held in a normally deasserted state and in turn maintaining said at least one output of said higher voltage device in a non-asserted state until said lower voltage device reaches a power-up ready state wherein said control output generated from said lower voltage device enables said at least one output enable of said higher voltage device.

8. The apparatus of claim 7 wherein said higher voltage interface and said higher voltage device operate at a substantially equal voltage.

9. The apparatus of claim 7 wherein said higher voltage device is a tri-stateable device having power off disable outputs.

10. The apparatus of claim 7 wherein said lower voltage device is a tri-stateable device having power off disable outputs.

11. The apparatus of claim 7 wherein said higher voltage device is a 5V backplane interface device.

12. The apparatus of claim 7 wherein said lower voltage device is one of a 3.3V Programmable Logic Device and a 3.3V CMOS Gate Array device.

13. An apparatus including mixed voltage circuitry that is hot-pluggable into a higher voltage interface, said apparatus having at least one lower voltage device and at least one higher voltage device, said at least one lower voltage device including a lower voltage supply input, at least one control output and at least one other input, and said at least one higher voltage device including a higher voltage supply input, at least one output and at least one output enable enabling said at least one output, comprising:

means for configuring said lower voltage device so that said at least one control output is deasserted when said lower voltage supply input of said at least one lower voltage device is not in a normal operation state;

means for configuring said higher voltage device so that said at least one output is deasserted when said higher voltage supply input of said at least one higher voltage device is not in a normal operation state;

interconnection means for interconnecting said at least one control output of said lower voltage device to said at least one output enable of said higher voltage device;

means for maintaining said at least one output enable of said at least one higher voltage device in a normally deasserted state when said lower voltage supply input of said at least one lower voltage device is not in a normal operation state;

means for driving said at least one output enable of said higher voltage device with said at least one control output of said lower voltage device to enable said at least one output of said at least one higher voltage device when said lower voltage supply input of said at least one lower voltage device is in a normal operation state.

14. The apparatus of claim 13 wherein said means for configuring said lower voltage device so that said at least one control output is deasserted when said lower voltage supply input of said at least one lower voltage device is not in a normal operation state includes power off disable circuitry.

15. The apparatus of claim 13 wherein said means for configuring said higher voltage device so that said at least one output is deasserted when said higher voltage supply input of said at least one higher voltage device is not in a normal operation state includes power off disable circuitry.

16. The apparatus of claim 13 wherein said means for maintaining said at least one output enable of said at least one higher voltage device in a normally deasserted state when said lower voltage supply input of said at least one lower voltage device is not in a normal operation state includes one of pull-up and pull-down circuitry connected to said at least one output enable.

17. The apparatus of claim 13 wherein said at least one control output is deasserted by maintaining said at least one control output in a high impedance state when said lower voltage supply input of said at least one lower voltage device is not in a normal operation state.

18. The apparatus of claim 13 wherein said at least one output is deasserted by maintaining said at least one output in a high impedance state when said higher voltage supply input of said at least one higher voltage device is not in a normal operation state.

19. The apparatus of claim 13 wherein said higher voltage interface and said higher voltage device operate at a substantially equal voltage.

20. The apparatus of claim 13 wherein said lower voltage device and said higher voltage device are tri-stateable devices having power off disable outputs.

* * * * *